United States Patent [19]

Ahlbom et al.

[11] Patent Number: 4,922,543
[45] Date of Patent: May 1, 1990

[54] IMAGE PROCESSING DEVICE

[76] Inventors: Sten Hugo Nils Ahlbom, Gamla Vägen 4-6, S-421 77 Västra Frölunda; Bo E. Kennedy, Thujagatan 28, S-230 44 Vintrie; Bo N. Åkerlind, Box 2068, S-125 02 Älvsjö, all of Sweden

[21] Appl. No.: 916,969
[22] PCT Filed: Dec. 13, 1985
[86] PCT No.: PCT/SE85/00522
§ 371 Date: Jan. 2, 1987
§ 102(e) Date: Jan. 2, 1987
[87] PCT Pub. No.: WO86/03866
PCT Pub. Date: Jul. 3, 1986

[30] Foreign Application Priority Data

Dec. 14, 1984 [SE] Sweden ............... 84063866
May 10, 1985 [SE] Sweden ............... 85023422

[51] Int. Cl.[5] ............................................. G06K 9/00
[52] U.S. Cl. ............................... 382/48; 382/45; 382/46; 382/18; 356/152; 364/768
[58] Field of Search ............... 382/44, 45, 46, 65, 382/68, 48, 18; 356/152; 364/768

[56] References Cited

U.S. PATENT DOCUMENTS

| | | | |
|---|---|---|---|
| 3,506,837 | 4/1970 | Majima | 382/68 |
| 3,770,942 | 11/1973 | McMurtry | 382/68 |
| 3,959,771 | 5/1976 | Uno et al. | 382/18 |
| 3,993,888 | 11/1976 | Fellman | 382/68 |
| 4,017,721 | 4/1977 | Michaud | 364/506 |
| 4,021,778 | 5/1977 | Ueda et al. | 382/30 |
| 4,091,394 | 5/1978 | Kashioka et al. | 382/48 |
| 4,259,661 | 3/1981 | Todd | 382/27 |
| 4,327,354 | 4/1982 | Persoon | 382/15 |
| 4,725,973 | 2/1988 | Matsuura et al. | 364/736 |

Primary Examiner—Leo H. Boudreau
Assistant Examiner—Yon Jung
Attorney, Agent, or Firm—Pennie & Edmonds

[57] ABSTRACT

Image processing means is disclosed for calculating the position and orientation of an object with a known shape using a video signal from a TV-camera steadily aimed at the object. The means have a window memory into which are written several windows that are selected and shaped in advance, each of them covering a part of the picture received from the TV-camera. A window result memory has at least one memory cell per window and can be addressed by the window memory. An adder circuit is at its first input fed with a digital signal based on the in-signal of the TV-camera and at its second input with the contents of the memory cell of the window result memory corresponding to the window containing the pixel of current interest in the signal from the TV-camera. After this accumulating adding, the adder circuit returns the result to the same memory cell in the window result memory. After each image recording a comparison device compares the values of a set of cells selected beforehand in the window result memory with a set of values recorded from a reference object with a position and an orientation which are completely defined. Using the result of the comparison, at least one parameter is computed regarding the translation or rotation of the object relative to the reference object.

31 Claims, 6 Drawing Sheets

IMAGE PROCESSING DEVICE

The invention here described refers to an image processing device as specified in the introduction to claim 1.

A great deal of effort has been spent and is being spent in order to identify and determine the location and orientation of an object by measuring characteristics of an image of the object which is sensed by a TV-camera for example. Beside a number of military, medical and space applications the use of such a remote measuring technique is very attractive for automization tasks within the mechanical engineering industry.

The interest in workshop applications emanates, among other things, from the fact that many monotonous operations still have to be performed manually. The operator's vision and related coordination of action are in many cases very difficult to replace with technical means. Production with a significantly reduced work-force compared to the situation today seems to be difficult to realize until effective systems based on artificial vision are available at reasonable cost.

Mechanical production is a suitable field for image processing, due to the fact that one often has detailed knowledge about which objects one wishes to make measurements on and how their images will look when generated by a specified imaging sensor. It is also often possible to arrange illumination and background so that the objects will be seen clearly and with good contrast against the background.

The measuring set-ups can often be made fairly reproducable for periodic measurement, although variations of illumination and image variations due to the actual location of the object relative to the optical axis might cause difficulties. Unsophisticated image processing devices have only taken a small share of the market due to their tendency to fail too often. The development of sophisticated systems within this technical area is continuing especially for cooperation with industrial robots. One known robot vision system is marketed by the Swedish company ASEA. The image processor which is a part of this system extracts by digital filtering and picture noise suppressing algorithms, among other means, the contour lines from pictures from a TV-camera. The system is able to process scenes which are fairly weak in contrast. From the contours, the location and identity of the objects within the picture are determined as well as the objects' orientation relative to some reference direction. The contour-lines are compared during this process to contour data previously obtained from a reference object and processed and stored within the memory of the equipment.

There are other known systems, where the seeking process takes place in a memory containing previously stored data which describe characteristic details of the pictures of the objects (such as blobs) their area, ratio between area and circumference, the centre of gravity of the area etc., in order to make similar computations to those just referred to.

Systems of this latter type are rather demanding on the operator whose responsibility it is to "teach" the equipment how to solve its task by using reference objects taken from the production line. One example of such a system is "Machine Vision" originally developed at MIT in the U.S.A.

The previously known systems are complicated and expensive. The goal set up for the invention has been primarily to solve a class of workshop problems, which are simple from the image processing point of view and where low cost is essential. In spite of the requirements of low cost, one also wants a system of this kind to perform in a way that is easy to understand and easy to handle for an operator who has not been given specialist training. The requirements specified above are solved in accordance with the invention by equipment characterized by what is claimed under claim 1. Further improvements and developments are described in the following claims.

A graphic terminal nowadays usually works in a so-called raster-scan mode. That means that the displayed field is scanned line by line using standard TV-technology. The market for graphic terminals is large. Advanced circuits used to generate pictures controlled by a computer are therefore available at quite reasonable costs.

According to the invention, the graphic display techniques are utilized to provide an inexpensive but powerful electronic processing unit. The invention makes use of the fact that, with the above mentioned components, it is easy to generate a large number of windows (or picture sections) which may be formed or located within a TV-standard frame. It is also possible to obtain at low cost circuit units which, controlled by a microprocessor, can create the required window pattern. The windows are used to control operations on a digitized video signal generated in a common TV-camera or other similar image-creating sensor. Each window is individually processed during a scan of the picture. After a complete frame scan a computer gets the array of results of the separate window processings and produces a combined final result which is delivered as an output from the equipment.

In the previously known systems that extract contour lines, contrast gradients are enhanced by filtering in the image. Due to that filtering the systems are sensitive to sensor noise especially of high frequency and it might be necessary to include means to suppress such noise pixels (pixel: short for picture element i.e. the smallest area of a picture screen for which colour or intensity can be altered), which do not give information concerning the position of a contour line. According to the invention there are several measuring sections (windows) available that can be separately formed within a picture frame (e.g. 256).

The invention works with filters, which use accumulated adding, that strongly compress and reduce the information content of an image and that are far less sensitive to random noise than the conventional systems.

The invention is described in greater detail below with reference to the attached drawings, where FIG. 1 shows a block diagram of a first embodiment of the means according to the invention;

The means according to the invention works with a window-set, where each window has a separate form but is part of a pattern formed of all the windows together. According to the invention this whole window pattern is translationally moveable over the TV-frame and is rotationally symmetric. In the TV-frame there is also an image of the object whose location and orientation are to be measured. Although the window pattern will in practice first be scrolled on the TV-display in the horisontal (x) and vertical (y) directions until its center coincides with that of the object, we will first describe the performance of the means when this scrolling is completed. Thereafter follows a description of several methods of achieving this x-, y-scrolling.

Figure 1:
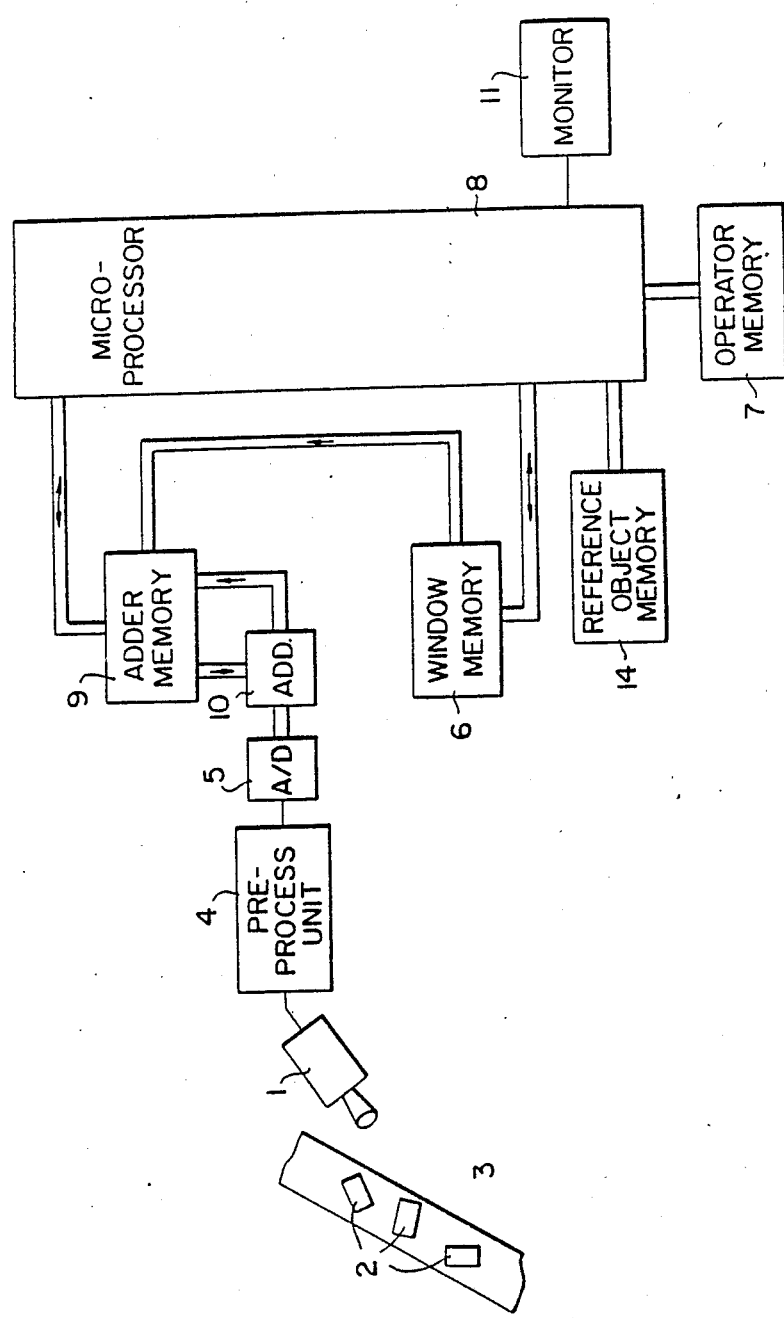

In the block diagram in FIG. 1 a TV-camera 1 is focussed on an object 2 which is transported by a rolling belt 3 or similar equipment. Camera 1 is steadily aimed at the object 2 either directly or indirectly via some kind of movable mirror system which compensates for the movements of the object during the measuring cycle in a way that is in itself well known, and that is of no importance for the invention and therefore will not be described here. During the measuring time, the object does not move relative to the optical axis of the camera or moves so slowly that it does not significantly influence the accuracy of the measurement. The video signal from camera 1 is preprocessed in a preprocessor unit 4 in a well known way and is converted to a sequence of digital signals in an analog-to-digital converter 5. In a digital window memory 6 there are stored the size and position of the various windows. In principle a window is a definition of a certain number specified but arbitrary positioned pixel addresses within the picture frame. This window memory will be read synchronously with the output of the sequence of digital data (signals) from the converter 5. By the contents of memory 6, an operator is designated to each pixel within a predefined rectangular area, which covers at least the larger part of the picture (or is equivalent to the whole picture). Each pixel within the rectangle thus has a unique counterpart in an operator memory 7 which is connected to a microprocessor 8. Windows positioned within this area are used to define active operations on equivalent pixel grey scale values. The output of window memory 6 is connected to one of the inputs of an adder memory 9. The adder memory 9 has a dedicated memory field for each window. An adder circuit 10 has one of its inputs connected to the output of the adder memory 9 and its second input to the output of the analog-to-digital converter 5. A window operator dedicated to each pixel within a certain window activates an accumulating addition of all grey scale values of pixels contained by the window. The values are added in the adder circuit 10 in the order they come into an accumulating register designated to the windows and forming parts of the adder memory 9. The operator which characterizes a window, consists of the address to the accumulating window register to which a present pixel value shall be added to the last registered sum.

When the video signal representing a whole TV-picture (or the part defined by the whole active rectangle) has been processed (in real time) by the window operators, there are in the registers of the adder memory 9 a sum stored for each window. These sums bear information which is characteristic of an image of an object and its location and orientation, provided that the windows have been formed and positioned in a relevant way within the picture frame. The picture is displayed on a monitor unit 11, which is preferably a TV-screen.

One condition that can be placed regarding the shape of the windows is that the image of the object must generate almost analogous and recognizable sequences of window sums, when the object is translated and turned within given limits. It ought to at least be possible to separate translation and rotation by the imaging processing scheme.

Rotation can be distinguished by placing the windows rotationally symmetrically around one manually chosen centre point in the picture.

Figure 2:
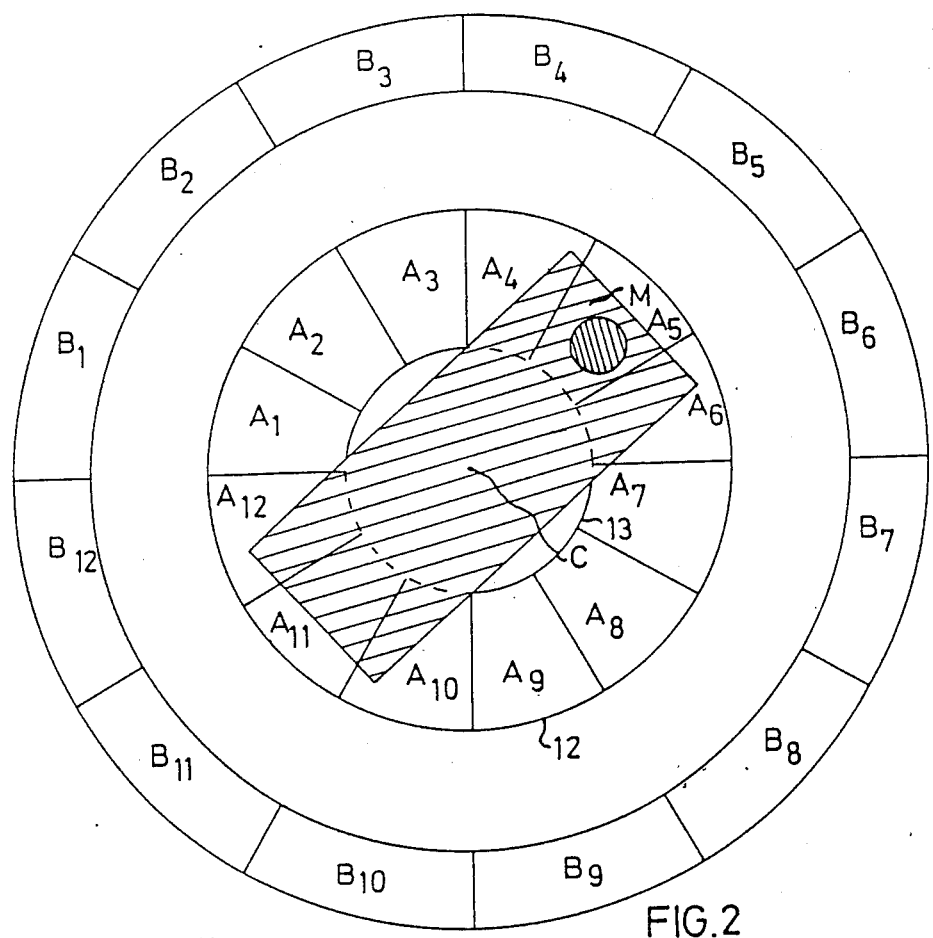
FIG. 2 shows the first embodiment and the relative placement of windows on a TV-display where an object to be measured is placed.

In FIG. 2 a rectangular (light) object M is shown which has a (darker) hole drilled near one of the short sides. M is positioned with its centre where the centre of the window pattern is. In this realization of the window pattern, the windows are shaped as a number of circle sectors $A_1$–$A_{12}$ which together form a circle 12 with centre point C. The circle radii shall be chosen so large that the characteristic details are covered by a good margin by the area of the circle divided into sectors.

The number of sectors are chosen in such a way that the width of one sector is of about the same size as the measure of the characteristic details, which define the orientation of the object. In order to give each sector a share of characteristic information that is as large as possible, an inner circular area 13 is out off from the sectors.

Figure 3:
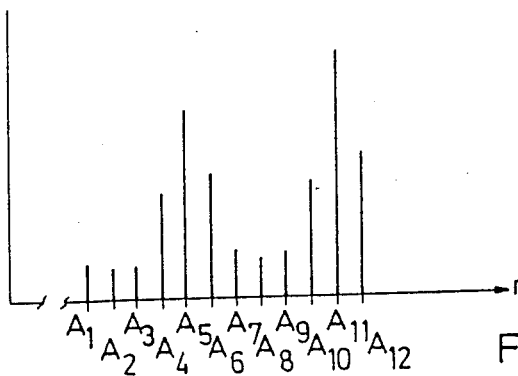
FIG. 3 shows how numeric interpolation may be used to compute a more accurate value of the orientation angle of the object.

To summarize, the operator selects the centre of the circle, an inner and an outer radius and the number of sectors in the cake-shaped pattern which form the windows $A_1$–$A_{12}$ that in fact have filtering functions in that the partial sums together give characteristic information of an object of current interest. These sums can be represented e.g. in a histogram as FIG. 3 shows. Before being put in the histogram the sums A are preferably normalized (the same symbols are used here as in FIG. 2) by division by the number of pixels which are contained within each truncated sector, and if desired also normalized in that the highest value is set at a suitable value, e.g. 32 or 64 and all other values scaled linearly with respect to that. The highest value chosen depends on the resolution of the A/D-converter 5 and other factors.

If still another circle ring $B_1$–$B_{12}$ is generated (see FIG. 2) which is split by borders that are radial extensions of those in the inner circle $A_1$–$A_{12}$, this complementary set of windows can to some extent be used to compensate for inhomogeneties in illumination and/or reproduction. If the background is of a homogenously reflecting material, the normalized sums of the pixel grey scale values of the outer ring are measures of the illumination level in each sector as it is sensed by the camera. A division of the sums $A_i$ with the related (normalized) sums $B_i$ gives such a crude compensation.

Before the actual measurements take place a reference measurement is made with a reference object carefully put into a desired position and orientation. A histogram of the object generated, as discussed above with or without normalization and compensation, as shown in FIG. 3, is stored in a memory 14 connected to the microprocessor 8.

During the subsequent measurements, the camera 1 reproduces a new, similar object with the same illumination, background optics, etc.

That object is at first assumed to be positioned with the centre for the circular rings $A_1$–$A_{12}$, $B_1$–$B_{12}$ at about the same point as was the case at the reference exposure generating the stored histogram values. That is, we here assume that the scrolling of the window pattern within the TV-picture is already accomplished. The object which is due to be measured is, however, in a way that is not known beforehand, rotated compared to the reference picture. Another histogram $A'_1$ is now measured and computed from this image with the window-pattern unmodified as compared to the reference measurement. This second diagram should then assume a shape that is similar but displaced compared to the first one. The displacement is a direct measure of the relative angle between the objects in the two pictures computed as a number of sector cone angles. It can be calculated by correlation, i.e. from the position (in k) for maximum of F (k) where $$F(k)=A_1{}^*A'_{1+k} \times A_2{}^*A'_{2+k}+ \ldots +A_N{}^*A'_{N+k}$$

$$k=0, 1, \ldots, N-1$$

$$A'_{N+m}=A'_m$$

By numerical interpolation, e.g. using a second order approximation, a more accurate angle resolution results if the case is favourable in that the object contains suitably distributed characteristic details relative to the sector divisions.

Figure 4:
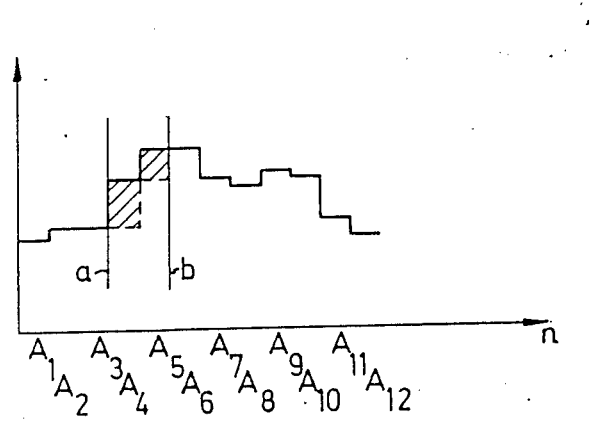
FIG. 4 shows how it is possible to use numeric interpolation to compute a more accurate angle value when an object is rotated.

Another more direct method to get a more accurate angle resolution is to select a part of a histogram curvature, shown by a continuous line in FIG. 4, where a more pronounced variation exists in the reference histogram as is the case between the two vertical lines a and b.

If one moves this part of the diagram e.g. one sample interval (=one angle step) to the right (shown as a dashed line in FIG. 4) and computes the area between these two curves (shaded) one gets a measure of the sensitivity to a rotation expressed in terms of area/angle unit. When measuring a new object the orientation is calculated with an angle inaccuracy that corresponds to the sector cone angle. After that one selects the same part of the histogram curve as of the reference histogram, rescales the new curve so that the new curve and the reference have the same amplitude swing and generates an area between two curves in the same way as by the calibration described above. The value of the area is then directly convertible to a difference in angle, sign included. It is possible to improve the angle resolution by this method by a factor of 2–10, depending on the gradients of the histogram.

As a variation it is possible to use numerical interpolation under the assumption that the amplitude change between two steps of the histogram is limited and that the curve becomes continuous if the number of (assumed) sectors is made large enough. In that way sample values, which are calculated by numerical interpolation, are arranged equidistantly along the circle ring, so that they correspond to a set of sectors several times more numerous than of the original pattern. If both the reference and the curves in question are extended in a corresponding way, it is in favourable cases possible to get a higher resolution of angle. The methods described are similar. With a reasonable number of windows (N 30) this whole process of calculation of two objects that are nearly alike can be done in less than 20 msec which is the half frame rate of a 50 Hz standardized TV-camera. The means are processing pixel data in real time and only store the sector sums $A'_i$ and $A'_i$ and possibly $B_i$ and $B'_i$, which altogether constitute a very condensed and reduced amount of data.

Figure 5:
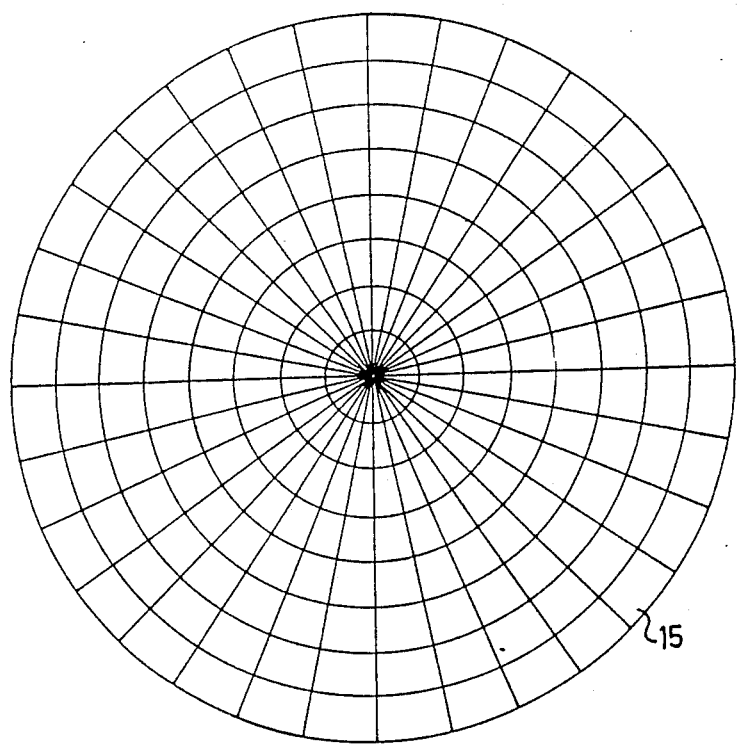
FIG. 5 shows an extended variant of the window pattern shown in FIG. 2.

Another realization of the window pattern is shown in FIG. 5. There a circle 15 is divided into 32 sectors. The circle 15 is divided into 8 rings also. Each window in this window-pattern is consequently generated by a truncated circle sector and the number of windows is $8 \times 32 = 256$. For a certain object due for a reference measurement, the operator is able to choose suitable rings of the pattern in FIG. 5 to correspond to the rings $A_1$–$A_{12}$ and $B_1$–$B_{12}$ as shown in FIG. 2 in order to get the histogram according to FIG. 3. The complete window-pattern as in FIG. 5 then can be permanently written into the window-memory 6. It is the microprocessor 8 which produces the histogram as in FIG. 3, deduced by what is registered in the different memory cells of adder memory 9 after a picture exposure.

Only permanently placed interfering objects are allowed to be reproduced in the same scene as the object at the exposure time when measuring. These objects are "inactivated" e.g. by positioning and shaping the circle ring windows so that they do not overlap the interfering objects. Permanent interfering objects may as an alternative be subtracted from the sums $A_i$ and $A'_i$ respectively by making a registration of background and interfering objects only in a reproduction $AO_i$ under conditions that in all other respects are the same. Techniques for corrections with respect to background are known already and will therefore not be described further here since this is not a part of the invention itself.

Above, it has been assumed that the object at the instant of measurement has merely been rotated in relation to the object at the reference measurement. It is, however, probable that the object will not be centered in the picture of the window-pattern as seen on the screen. In the class of applications which the means are intended for, the measuring objects are, however, not translated from the centre more than a distance that is about 0.51 times the largest dimension of the object, which is a diagonal, diameter or the like. This is accomplished using mechanical means for guidance and choosing suitable moments for exposure by external trigging of the TV-measuring system. The entire object to be measured must be assumed to lie within the active rectangle of the TV-frame at the moment of exposure.

If the object is not centered as assumed when the measurement of orientation has been described above but is translated as well as rotated in the picture, the calculation is done in two steps. The last of these steps then coincides with what has been described above.

Figure 6A:
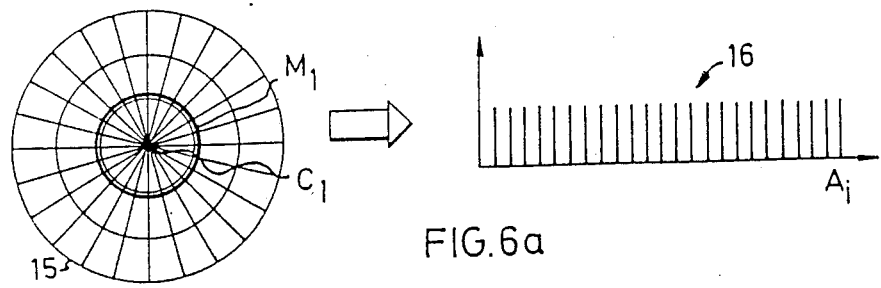
FIGS. 6a and 6b show histograms extracted from an object formed as a circular disc placed in the center or out of center, respectively, of a window pattern of the type shown in FIG. 2.
Figure 6B:
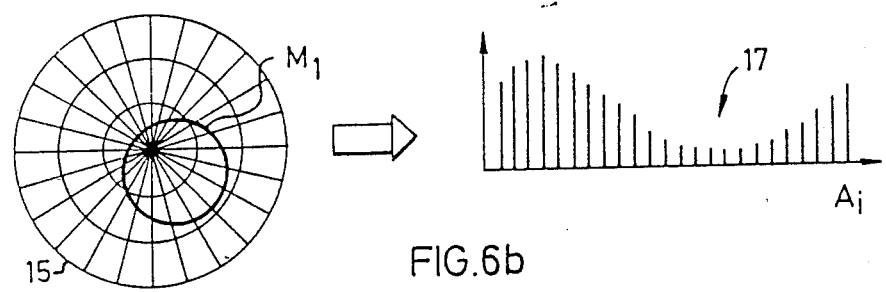

The first step which indicates if the object is translated, is based on the following. A circular (light) object M, seen against a (dark) background results in a histogram $A_i$ 16 which in principle consists of N bars all of the same height, if the centre $C_1$ of the window pattern coincides with the centre of the object (see FIG. 6a). If those centres are displaced referred to each other, the bar diagram generates a curve 19 which is similar to a whole sine cycle (see FIG. 6b).

If a circular reference object is moved a distance equal to a number of pixels in a certain sector direction before the reference curve $A_1$ is registered, the value—given in pixel-size units—of a translation of a subsequently measured object can be calculated approximately from the correlation curve calculated as described earlier. The difference between the maximum and minimum values of the correlation curve constitutes a squared value of the displacement of the object referred to the calibrated displacement of the object in the ideal case (homogeneous object, homogeneous background). The sum $A_k$, supposing that the direction of the displacement is into sector k, will increase in proportion to the square of the value of the displacement. At the same time the sum of the opposite sector will decrease in the same way.

Approximately the same is true if an arbitrarily shaped object is moved in the scene. An oblong shape, both translated and turned, may nevertheless result in a curve which poorly conforms with this approximate relation.

In the general case it is true that an approximate value of the translation in the image plane may be calculated from a first comparison with the measured sequence $A'_i$ to a sequence $A_{1i}$, which emanates from a measurement with a reference object, when its centre is displaced a specific distance in relation to the centre of the sector rings. (It is possible also to have reference images stored in the reference object when it is out of centre to various degrees.) To save the cost of a complete digital memory for a TV-frame it is advantageous to calculate the sum $A'_i$ as before in real time. Until the next frame is exposed 20 msek later (50 hZ TV-systems), the circle ring window pattern is moved to a new, computed centre which is near the centre of the object by using the so-called scrolling technique or moving the whole window-matrix along and across the TV-raster lines, i.e. in the x and y directions. The same calculations are applied again to the new sums $A''_i$ which again are correlated to those of the reference diagram representing the initial reference measurement, where the centre of the object and the window pattern were in coincidence. If the sine-like curve in the resulting correlation diagram still dominates, another interpolation is done to get a new centre value that is more nearly correct. As soon as the centre is almost correct, the rotational angle may be calculated as before. The image of the object is fixed on the display while the window pattern is scrolled into new positions.

If one requires very exact angle and position values, it is possible to determine the position of some finer detail in the picture by using a set of sector windows (having small radii) and scroll these to the predicted position of the centre of the detail in question. The position of that centre is in turn measured by the above described method using successive interpolations. In this latter case, one has to assume that the operator has made the corresponding actions by manual commands when preparing reference data. Measuring in this way, one has to accept a delay of a number of frames to get a higher accuracy and reliability. The delay is at most four and at least one frame time (20 msec) depending on how large the out-of-centre distance was at the beginning of the measurement or what accuracy was required.

The set of circle rings may be generated in the following way. The inexpensive graphic electronic components which are made use of in the means are loaded with their window definitions via the microprocessor 8 and its memory. The transfer of window pattern data is not so fast that it is possible to transfer a larger number of windows within 20 msec, which is desirable. A translation of the scroll type is on the other hand rapidly commanded and is possible to accomplish from the exposure of one frame to the next. An effective way to generate the sector windows is to build them up by using several connecting concentric circle rings (see FIG. 5) all of which are divided by the same radial cuts. In this way a kind of polar coordinate system is configured. Such a pattern may be included via a PROM as a standard matrix in the means. When the operator is adapting the means to a new reference object, his task is to decide which circle rings are to be used for measurements of background, illumination levels, translation or rotation for example and also for a precision measurement which might be the last step in a complex case.

It is also possible to have two different sets of window patterns stored in a PROM, one of which is shaped as in FIG. 5 or FIG. 2 and the other as an ordinary chess pattern (Cartesian coordinate system). The second pattern may then serve when investigating translations. I.e. the centre of gravity is computed by using another x/y-operator in the form of two sets of strips oriented in the x- and y-directions respectively. The strips are approximations of the x and y which are contained in the mathematical definition of the centre of gravity of a (two dimensional) body. The calculation of the centre of gravity is preferably done using two frames after each other or by using two signal processors working in parallel since two patterns must not overlap. In the latter case one processor adds pixel values in x-strips via an x-strip window PROM and the other via a y-strip window PROM. The centre-of-gravity mode used for calculation of the translated position of the object is active when the PROM with the x-, y-strips are substituted and used one at a time instead of the cake-shaped circle ring pattern. Not until then the PROMs with the cake-shaped pattern are made active again, and positioned at the centre of the object so that the angle of rotation of the object can be indicated as before.

It is, however, an advantage if a single window pattern could be used both to find the "centre-of-gravity" in the TV-picture and to measure the angle of orientation. The reason for this is that in a practical embodiment one avoids thereby the time and cost consuming process of transferring into a dedicated memory area the window pattern to be used in the next frame before it is exposed. As said above, such a memory transfer via the processor should preferably be completed during less time than it takes to switch frames. This is a demanding task.

Figure 7:
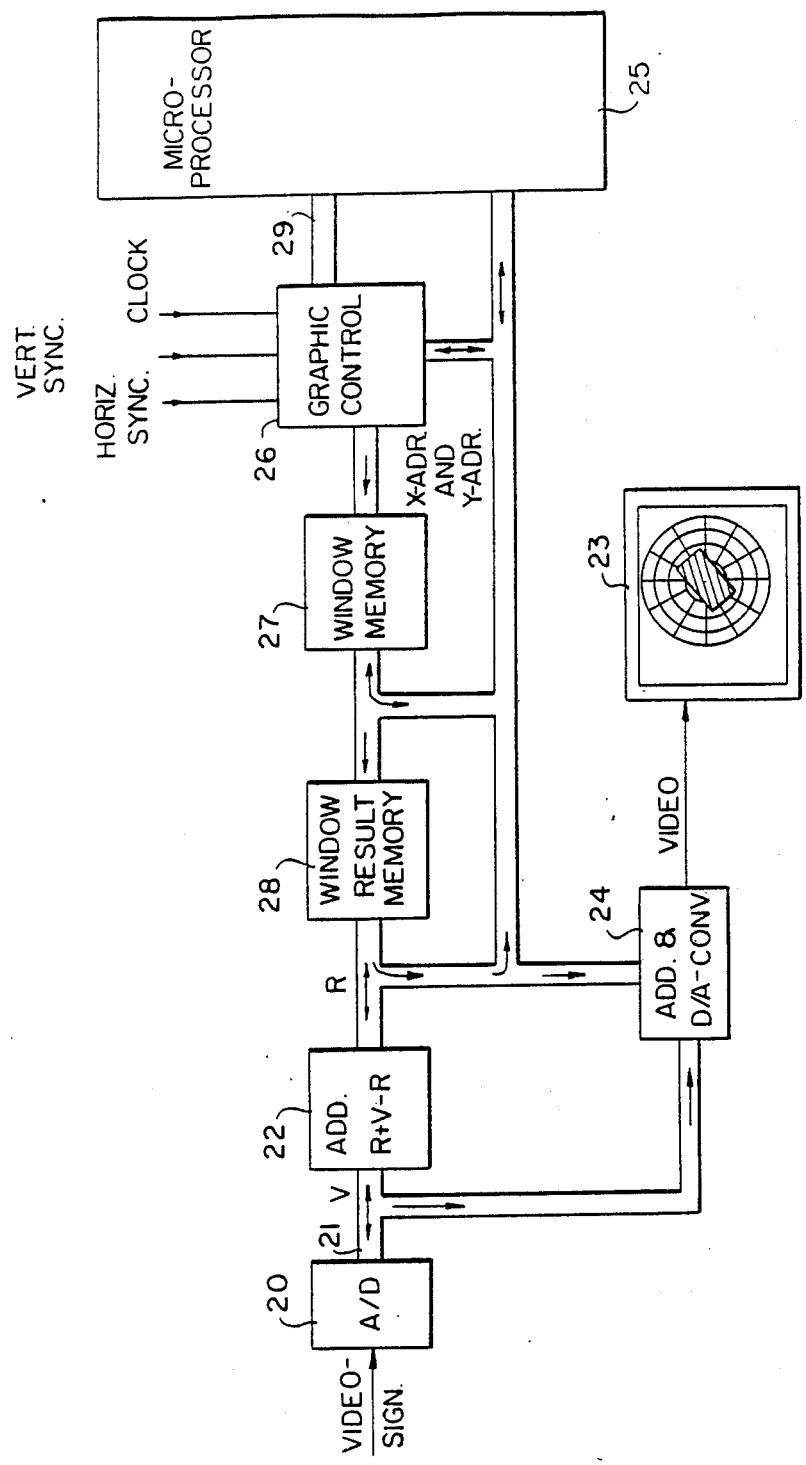
FIG. 7 shows a block diagram of a second embodiment of means according to the invention.

FIG. 7 shows a block diagram of one realization of an electronic circuit which makes use of the window pattern shown in FIG. 5, to indicate in a more direct way than described above both the translation and the rotation of an object referred to a reference object for which an earlier registration has been made and stored. In the circuit in FIG. 7 is also shown the unit in FIG. 1 which contains the window memory 6, adder memory 9 and the adder circuit 10, but formed in another way.

The video signal from the TV-camera, if necessary processed to get rid of signal parts which contain elements of the permanent background, is fed to an analog/digital converter 20, in a manner known per se, with a suitable sampling rate to convert the incoming analog video signal to a sequence of digital signals, e.g. six-bit signals, which appear on a parallel output of converter 20 connected to the input of the adder 22, corresponding to adder 10 in FIG. 1.

Since an image of the measuring object is to be presented on a screen 23, the output signal of analog/digital converter 20 is fed to a circuit 24 which converts the signal from unit 20 from digital to analog form before it is transferred to the picture screen 23. On screen 23 the window pattern in use shall also be displayed. The digital/analog converter 24 is therefore equipped with a second input, into which there is fed a signal, representing the window pattern with its relevant position in the picture, to be added digitally to the signal from the converter 20 before the digital/analog conversion. In order not to make the picture of the window pattern too dominating, the circuit 24 performs in a way so that single pixels may be reproduced with an intensity increase of up to 10% on the screen.

At the reference measurement of a reference object the whole window pattern is displayed with all its rings in different shades of grey, and the operator then selects via microprocessor 25 those rings which shall operate actively in the equipment. After each of the subsequent measuring cycles on an object those signals which mark the selected rings are fed to the second input of the converter 24 so that the various sectors are indicated e.g. by shading one sector darker and the next lighter.

A graphic control circuit 26 commands a window memory 27 on a first address bus, so that it gets an address signal which gives the coordinates on the screen but transformed so that the origin is positioned in the relevant centre of the window pattern in the picture. Each window of the window memory 27 has a number of its own, e.g. numbers 1–256 if the window pattern shown in FIG. 5 is used. By commands from the graphic control circuit 26, the output signal from window memory 27 is fed into two parallel branches to the "adder and digital/analog-converter" 24 in order to generate by graphic means a picture on the screen, which can be viewed as superimposed on the incoming scene from the TV-camera.

For each pixel within the window pattern area a window number is delivered accordingly, which represents the window to which that pixel belongs. That number is fed as an address to the window result memory 28, corresponding to the adder memory 9 in FIG. 1. By letting in this way the window number be an address to still another memory 28, a certain memory location will be brought forth when the TV-camera scans the pixels within the corresponding window.

This method, which lets data within the window memory 27 generate addresses to the window result memory 28, makes it possible to deal with a large number of measuring windows the shapes of which are individually and freely chosen and makes it possible to process the signals in real time, which in this case means at the same time as the TV-camera generates the video signals. The consequence is that the process time is short and that no separate video memory (frame grabber) is needed.

The data bus from the window result memory 28 is connected to the adder circuit 22 which receives the accumulated value R in the memory cell that is addressed by the window memory 27, and adds that to the value V, that is fed to the second input of the adder circuit and stores that fresh value R as a new, accumulated value in the same memory cell belonging to memory 28. This is controlled during various sequences by the microprocessor 25. The separate control bus lines for serial command between the processor 25 and the various units that are a part of the circuit are not shown in the figure in order to make the figure easier to read.

When a new measuring object has been brought into position for a measuring sequence within the field of view of the TV-camera, the first operation is to measure the value of the translation compared to the position of the reference object.

This is accomplished in one of the ways which have been described earlier or according to the embodiment which will be described below. FIG. 7 will be the same whichever of the embodimets is selected for measurement of a translation.

The processor 25 indicates to the graphic control circuit via a lead 29 which mode of operation is relevant, i.e. if it is the angle of rotation or the translation in the x- or y-directions that is to be investigated. Upon indication of a translation in the y-direction the graphic control circuit 26 produces addresses so that during the transformation of the window pattern relative to the TV-picture, there is no movement in the y-direction but there is movement in the x-direction in such a way that the centre of the pattern in the x-direction for each sensed pixel is situated approximately directly at a vertical line through that pixel. This is of course not possible to see on the screen since the translation of the pattern follows the path of the electron beam when it scans a TV-raster line. On the screen, one can see a broad, light horizontal band. By this fluent movement in the x-direction only windows in the window result memory 28 which are close to the vertical, i.e. somewhat to the left or to the right of a possibly completely vertical border line, within the window memory will have accumulated values registered after the scan of a whole frame. After that a calculation similar to the "centre of gravity" calculation will be processed with only those cells in the window result memory 23 which correspond to the approximately vertical, radial array of cells in the window memory and where information has been accumulated and registered, the displacement in the y-direction relative to the reference position will be computed and stored. In the next step the window pattern is scrolled in the y-direction to the predicted position.

During the next picture frame in the cycle the transformation of the window pattern is not moved in the x-direction but is moved fluently relative to the TV-screen in the y-direction in a way analogous to that described above. Accumulated sums are stored in the cells in the window result memory 23 which correspond to an almost horizontal, radial array of windows in the window memory. The calculation of the displacement in the x-direction is processed and the window pattern is scrolled in the x-direction.

According to the invention it is also possible to have a part of an object having an already known position and orientation examined to check if it has a certain characteristic at a predetermined location on the object. The position and orientation of the object could be derived in the way described above but it is also possible to have an object examined having an exactly predetermined position and orientation as well. A measuring purpose can be some sort of quality control for example, to see if certain projections have the exact predetermined localizations or a check to see if a certain manufacturing operation, such as drilling a hole, has actually been made before going to the next manufacturing step.

In the last mentioned case, the basic task is to avoid damage to machinery or tools. For example, a thread cutting cannot be performed automatically if you cannot be sure that a hole having the proper location and-/or the proper diameter is provided in front of the threaded tap. Another example of the application of this embodiment of the invention is to have the tip of a syringe exactly located in order to put a cover on it or the like.

Figure 8:
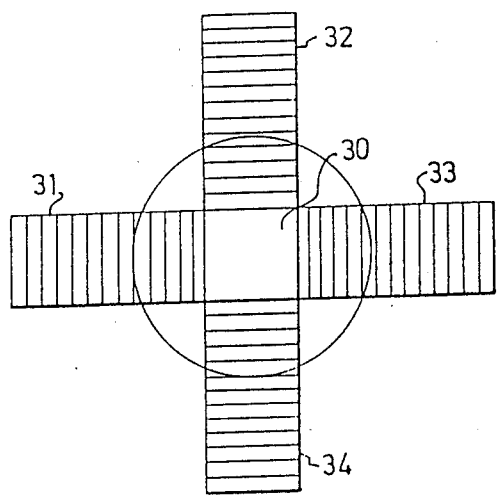
FIG. 8 depicts a window configuration particularly suited for measurement of drilled holes in an object.

In order to achieve this possibility, a particular window configuration can be stored in a PROM in an electronic module of the same type as the one containing the circular window configuration described above, the computer being programmed to shift the window configuration at the request of the operator. A window configuration particularly suited for measurements of drilled holes in an object is shown in FIG. 8. In this, the windows are arranged in a cross having one centre window 30 and the rest of the windows along the arms 31 to 34, each window having a dimension along the arm amounting to only one or a few pixels but having a dimension perpendicular thereto amounting to at least several pixels.

The center of the hole, which is normally shown dark on a TV-screen, can be calculated as an independent measuring of the position of the center in the x- and y-direction, respectively, using the sums stored in the individual cells in the window result memory for the individual windows using an inverted grey-scale in the image.

The position of the center point can be iterated by making a measurement, having the window configuration scrolled to the calculated position, making a new measurement, scrolling again etc. until a stable and close position has been reached.

The easiest way to find the hole diameter is to make a standardization taking the window sums representing the blackest and whitest areas into consideration as a relation between the total sum of all the windows having sums in the inverted grey scale at the measuring in question and the total sum at a reference measurement. The relation is a measure of the relation between the hole surfaces and hence of the square of the relation between the radii.

Another method is to determine the borderline between black and white in the x- and y-arms, respectively, and hence directly determine the diameter. A plurality of known filters of different types may be used to determine the location of the boundary of the hole if the sums $x_i$ and $y_i$ can be regarded as simple pixel values.

The example given above shows how the principle of using a window configuration in accordance with the invention can be used in order to make exact measurements of positions and measurements of entire objects or parts of objects in known positions and orientations. The method gives very compressed, integrated information from selected parts of the image.

Figure 9:
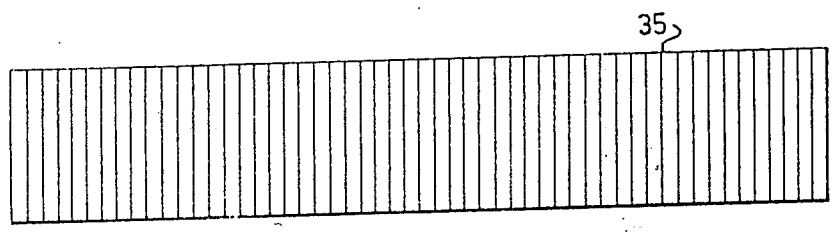
FIG. 9 depicts a window configuration particularly suited for fault detection of a continuously running string of material.

In still another embodiment of the invention, the camera 1 (see FIG. 1) can be directed to a path of a continuously running string of material in order to see if there are any faults in the surface of the material. A suitable window configuration for making such a material control is shown in FIG. 9 and contains merely a line 35 of windows each having a dimension along the line of only one or a few pixels but having a width perpendicular thereto amounts to at least several pixels, for instance about five to fifteen pixels. The camera is directed to the material string such that the window configuration overlaps the picture of the string at least almost perpendicular to the movement direction of the string.

We claim:

1. An image processing device for identifying characteristics of an object or a part of an object such as shape, location or orientation using a digitalized video signal from a TV-camera directed at said object or at a location where said object is placeable comprising:
   a window memory (6;27), in which a plurality of predetermined windows having predetermined shapes are stored, each window having a shape and location independent of the shape and location of said object as viewed by said TV-camera, and each window covering a part of the image obtained from said TV-camera,
   a window result memory (9;28) having at least one memory cell for each window, said memory being addressable from said window memory,
   an adding circuit (10;22) which receives a digital gray scale pixel value based on the signal from said TV-camera into a first input and the content of the memory cell in said window result memory (9;28) related to the window, which contains the picture point in question in the signal from said TV-camera, into a second input, and which circuit, after the adding operation, is adapted to store the result in the same memory cell in said window result memory, the contents of which were provided to said second input before the adding operation, and
   a comparator device (8;25), which, after every image recording of said TV-camera, compares the recorded values in the window result memory with a stored set of values recorded for a reference object or a reference object part and determines at least one parameter regarding the shape, location or orientation.

2. A device according to claim 1, wherein that the location in the x- and y-directions of the object or the object part in relation to the reference object or the reference object part, is adapted to be determined by said comparator device (8;25) during at least a first image recording, and that said comparator is adapted to change the window configuration location on the image obtained from said TV-camera by using the result of said determination such that the window configuration will be placed substantially in the same way in relation to the center of the object or the object part as it was in relation to the center of the reference object or the reference object part at the reference recording.

3. A device according to claim 2, wherein the rotational orientation of the object or the object part in relation to the reference object or the reference object part, is adapted to be derived from the result of at least one image recording after the location change of the center of the window configuration.

4. A device according to claim 1, wherein the window configuration is rotationally symmetric.

5. A device according to claim 4, wherein the windows are provided within a circle, called the window circle, which is divided into sectors, and in that every window is a circular ring part within one of the sectors having the same center as the window circle.

6. A device according to claim 5, wherein the comparator device, in order to determine the orientation of the object, compares a sequence of values obtained in sequence around a whole ring within the window configuration having a chosen inner and outer diameter with a sequence of values obtained under the same conditions from the reference object and is adapted to determine the displacement to be made between the sequences in order to make them at least almost alike.

7. A device according to any one of the preceding claims, wherein, in order to determine the translated location of the center of the object, at least two recordings of the reference object are stored, one of which is recorded having the reference object centered in relation to the window configuration and the rest are recorded having the reference object off-center in different ways in relation to a centralized position, and in that the comparator device is adapted to compare the set of values obtained at the actual recording with each of the sets of reference recordings after at least one image recording at the beginning of a position and orientation determination in order to find the manner and extent of the off-center relative and hence the displacement of the center of the object in relation to the reference object.

8. A device according to any one of claims 1–6, wherein, in order to determine the translated location of the center of the object in one of the Cartesian coordinates in the TV-image, the window memory is addressed such that one of said coordinates has the same coordinate transform during the whole image recording but such that the other coordinate has a changing coordinate transform, which follows the actual value of the coordinate during the image recording, and in that the comparator device (27) makes a calculation analogous to a center-of-gravity calculation using the values stored in cells in the window result memory (28) corresponding to windows placed approximately in the same direction as said coordinate.

9. A device according to any one of claims 1–6, wherein at least two different window configurations are stored in an extra memory, and in that each stored window configuration is transferable to said window memory.

10. A device according to claim 1, wherein the window configuration is a line of windows each having a dimension of one or only a few pixels along the line but having a substantially larger width, and that the TV-camera is directed at a moving material path such that the window configuration overlapping the recorded image is placed substantially perpendicular to the movement direction of the material path.

11. An image processing device for identifying characteristics of an object or a part of an object such as shape, location or orientation using a digitalized video signal from a TV-camera directed at said object or at a location where said object is placeable, comprising:
 a computer device,
 a window memory addressable from said computer device, in which a plurality of windows having predetermined shapes are stored, each window having a shape and location independent of the shape and location of said object as viewed by said TV-camera, and each window corresponding to a part of the image obtained from said TV-camera, said part being selectable by said computer device,
 a window result memory having a memory area for each window for storing an accumulated number related to said window, said window result memory being addressing from said window memory,
 an adding circuit which receives a digital gray scale pixel value based on the signal from said TV-camera into a first input and the accumulated contents of the memory area in said window result memory related to the window, which contains the picture point in question in said signal from said TV-camera, into a second input, and said adding circuit, after the adding operation, is adapted to store the added result in the same memory area in said window result memory, the contents of which were provided to said second input of said adding circuit before the adding operation, and
 a comparator device which, after every image recording of said TV-camera, compares the set of recorded values in the window result memory with a stored set or sets of values recorded for a reference object or a reference object part according to a predetermined comparison pattern and determines at least one parameter regarding the shape, location or orientation.

12. A device according to claim 11, wherein the location in the x- and y-directions of the object or the object part in relation to the reference object or the reference object part, is adapted to be determined by said comparator device during at least a first image recording, and that said comparator is adapted to change the window configuration location on the image obtained from said TV-camera by using the result of said determination such that the window configuration will be placed substantially in the same way in relation to the center of the object or the object part as it was in relation to the center of the reference object or the reference object part at the reference recording.

13. A device according to claim 12, wherein the rotational orientation of the object or the object part in relation to the reference object or the reference object part, is adapted to be derived from the result of at least one image recording after the location change of the center of the window configuration.

14. A device according to claim 13, wherein the window configuration is rotationally symmetric.

15. A device according to claim 14, wherein the windows are provided within a circle, called the window circle, which is divided into sectors, and every window is a circular ring part within one of the sectors having the same center as the window circle.

16. A device according to claim 15, wherein the comparator device, in order to determine the orientation of the object, compares a sequence of values obtained in sequence around a whole ring within the window configuration having a chosen inner and outer diameter with a sequence of values obtained under the same conditions from the reference object and is adapted to determine the displacement to be made between the sequences in order to make them at least almost alike.

17. A device according to claim 11, wherein, in order to determine the translated location of the center of the object, at least two recordings of the reference object are stored, one of which is recorded having the reference object centered in relation to the window configuration and the rest are recorded having the reference object off-center in different ways in relation to a centralized position, and in that the comparator device is adapted to compare the set of values obtained at the actual recording with each of the sets of reference recordings after at least one image recording at the beginning of a position and orientation determination in order to find the manner and extent of the off-center and the displacement of the center of the object in relation to the reference object.

18. A device according to claim 11, wherein, in order to determine the translated location of the center of the object in one of the Cartesian coordinates in the TV-image, the window memory is addressed such that one of said coordinates has the same coordinate transform during the whole image recording but such that the other coordinate has a changing coordinate transform, which follows the actual value of the coordinate during the image recording, and in that the comparator device makes a calculation analogous to a center-of-gravity calculation using the values stored in areas in the window result memory corresponding to windows placed approximately in the same direction as said coordinate.

19. A device according to claim 11, wherein at least two different window configurations are stored in an extra memory, and in that each stored window configuration is transferable to said window memory.

20. A device according to claim 11, wherein the window configuration is a line of windows each having a dimension of one or only a few pixels along the line but having a substantially larger width, and the TV-camera is directed at a moving material path such that the window configuration overlapping the recorded image is placed substantially perpendicular to the movement direction of the material path.

21. An image processing device for identifying characteristics of an object or a part of an object such as shape, location or orientation using a digitalized video signal from a TV-camera directed at said object or at a location where said object is placeable, comprising:
- a window memory (6;27) in which a plurality of predetermined windows having predetermined shapes are stored, each covering a part of the image obtained from said TV-camera,
- a window result memory (9;28) having at least one memory cell for each window, said memory being addressable from said window memory,
- an adding circuit (10;22) which receives a digital signal based on the signal from said TV-camera into a first input and the content of the memory cell in said window result memory (9;28) related to the window, which contains the picture point in question in the signal from said TV-camera, into a second input, and which circuit, after the adding operation, is adapted to store the result in the same memory cell in said window result memory, the contents of which were provided to said second input before the adding operation, and
- a comparator device (8;25), which, after every image recording of said TV-camera, compares the recorded values in the window result memory with a stored set of values recorded for a reference object or a reference object part and determines at least one parameter regarding the shape, location or orientation,
- wherein, in order to determine the translated location of the center of the object, at least two recordings of the reference object are stored, one of which is recorded having the reference object centered in relation to the window configuration and the rest are recorded having the reference object off-center in different ways in relation to a centralized position, and in that the comparator device is adapted to compare the set of values obtained at the actual recording with each of the sets of reference recordings after at least one image recording at the beginning of a position and orientation determination in order to find the manner and extent of the off-center relative and hence the displacement of the center of the object in relation to the reference object.

22. An image processing device for identifying characteristics of an object or a part of an object such as shape, location or orientation using a digitalized video signal from a TV-camera directed at said object or at a location where said object is placeable, comprising:
- a window memory (6;27) in which a plurality of predetermined windows having predetermined shapes are stored, each covering a part of the image obtained from said TV-camera,
- a window result memory (9;28) having at least one memory cell for each window, said memory being addressable from said window memory,
- an adding circuit (10;22) which receives a digital signal based on the signal from said TV-camera into a first input and the content of the memory cell in said window result memory (9;28) related to the window, which contains the picture point in questions in the signal from said TV-camera, into a second input, and which circuit, after the adding operation, is adapted to store the result in the same memory cell in said window result memory, the contents of which were provided to said second input before the adding operation, and
- a comparator device (8;25), which, after every image recording of said TV-camera, compares the recorded values in the window result memory with a stored set of values recorded for a reference object or a reference object part and determines at least one parameter regarding the shape, location or orientation,
- wherein, in order to determine the translated location of the center of the object in one of the Cartesian coordinates in the TV-image, the window memory is addressed such that one of said coordinates has the same coordinate transform during the whole image recording but such that the other coordinate has a changing coordinate transform, which follows the actual value of the coordinate during the image recording, and in that the comparator device (27) makes a calculation analogous to a center-of-gravity calculation using the values stored in cells in the window result memory (28) corresponding to windows placed approximately in the same direction as said coordinate.

23. An image processing device for identifying characteristics of an object or a part of an object such as shape, location or orientation using a digitalized video signal from a TV-camera directed at said object or at a location where said object is placeable, comprising:
- a window memory (6;27) in which a plurality of predetermined windows having predetermined shapes are stored, each covering a part of the image obtained from said TV-camera,
- a window result memory (9;28) having at least one memory cell for each window, said memory being addressable from said window memory,
- an adding circuit (10;22) which receives a digital signal based on the signal from said TV-camera into a first input and the content of the memory cell in said window result memory (9;28) related to the window, which contains the picturee point in question in the signal from said TV-camera, into a second input, and which circuit, after the adding operation, is adapted to store the result in the same memory cell in said window result memory, the contents of which were provided to said second input before the adding operation, and a comparator device (8;25), which, after every image recording of said TV-camera, compares the recorded values in the window result memory with a stored set of values recorded for a reference object or a reference object part and determines at least one parameter regarding the shape, location or orientation, wherein at least two different window configurations are stored in an extra memory, and in that each stored window configuration is transferable to said window memory.

24. An image processing device for identifying characteristics of an object or a part of an object such as shape, location or orientation using a digitalized video signal from a TV-camera directed at said object or at a location where said object is placeable, comprising:

a computer device, a window memory addressable from said computer device, in which a plurality of windows having predetermined shapes are stored, each corresponding to a part of the image obtained from said TV-camera, said part being selectable by said computer device, a window result memory having a memory area for each window for storing an accumulated number related to said window, said window result memory being addressable from said window memory, an adding circuit which receives a digital gray scale pixel value based on the signal from said TV-camera into a first input and the accumulated contents of the memory area in said window result memory related to the window, which contains the picture point in question in said signal from said TV-camera, into a second input, and said adding circuit, after the adding operation, is adapted to store the added result in the same memory area in said window result memory, the contents of which were provided to said second input of said adding circuit before the adding operation, and a comparator device which, after every image recording of said TV-camera, compares the set of recorded values in the window result memory with a stored set or sets of values recorded for a reference object or a reference object part according to a predetermined comparison pattern and determines at least one parameter regarding the shape, location or orientation, wherein the location in the x- and y-directions of the object or the object part in relation to the reference object or the reference object part, is adapted to be determined by said comparator device during at least a first image recording, and that said comparator is adapted to change the window configuration location on the image obtained from said TV-camera by using the result of said determination such that the window configuration will be placed substantially in the same way in relation to the center of the object or the object part as it was in relation to the center of the reference object or the reference object part at the reference recording, and wherein the rotational orientation of the object or the object part in relation to the reference object or the reference object part, is adapted to be derived from the result of at least one image recording after the location change of the center of the window configuration.

25. A device according to claim 24, wherein the window configuration is rotationally symmetric.

26. A device according to claim 25, wherein the windows are provided within a circle, called the window circle, which is divided into sectors, and every window is a circular ring part within one of the sectors having the same center as the window circle.

27. A device according to claim 26, wherein the comparator device, in order to determine the orientation of the object, compares a sequence of values obtained in sequence around a whole ring within the window configuration having a chosen inner and outer diameter with a sequence of values obtained under the same conditions from the reference object and is adapted to determine the displacement to be made between the sequences in order to make them at least almost alike.

28. An image processing device for identifying characteristics of an object or a part of an object such as shape, location or orientation using a digitalized video signal from a TV-camera directed at said object or at a location where said object is placeable, comprising:

a computer device, a window memory addressable from said computer device, in which a plurality of windows having predetermined shapes are stored, each corresponding to a part of the image obtained from said TV-camers, said part being selectable by said computer device, a window result memory having a memory area for each window for storing an accumulated number related to said window, said window result memory being addressable from said window memory, an adding circuit which receives a digital gray scale pixel value based on the signal from said TV-camera into a first input and the accumulsted contents of the memory area in said window result memory related to the window, which contains the picture point in question in said signal from said TV-camera, into a second input, and said adding circuit, after the adding ooperation, is adapted to store the added result in the same memory area in said window result memory, the contents of which were provided to said second input of said adding circuit before the adding operation, and a comparator device which, after every image recording of said TV-camera, compares the set of recorded values in the window result memory with a stored set or sets of values recorded for a reference object or a reference object part according to a predetrermined comparison pattern and determines at least one parameter regarding the shape, location or orientation, wherein, in order to determine the translated location of the center of the object, at least two recordings of the reference object are stored, one of which is recorded having the reference object centered in relation to the window configuration and the rest are recorded having the reference object off-center in different ways in relation to a centralized position, and in that the comparator device is adapted to compare the set of values obtained at the actual recording with each of the sets of reference recordings after at least one image recording at the beginning of a position and orientation deterrmination in order to find the manner and extent of the off-center and the displacement of the center of the object in relation to the reference object.

29. An image processing device for identifying characteristics of an object or a part of an object such as shape, location or orientation using a digitalized video siganl from a TV-camera directed at said object or at a location where said object is placeable, comprising:
- a computer device,
- a window memory addressable from said computer device, in which a plurality of windows having predetermined shapes are stored, each corresponding to a part of the image obtained from said TV-camera, said part being selectable by said computer device,
- a window result memory having a memory area for each window for storing an accumulated number related to said window, said window result memory being adressable from said window memory,
- an adding circuit which receives a digital gray scale pixel value based on the signal from said TV-camera into a first input and the accumulated contents of the memory area in said window result memory related to the window, which contains the picture point in question in said signal from said TV-camera, inot a second input, and said adding circuit, after the adding operation, is adapted to store the added result in the same memory area in said window result memory, the contents of which were provided to said second input of said adding circuit before the adding operation, and
- a comparator device which, after every image recording of said TV-camera, compares the set of recorded values in the window result memory with a stored set or sets of values recorded for a reference object or a reference object part according to a predetermined comparison pattern and determines at least one parameter regarding the shape, location or orientation,
- wherein, in order to determine the translated location of the center of the object in one of the Cartesian coordinates in the TV-image, the window memory is addressed such that one of said coordinates has the same coordinate transform during the whole image recording but such that the other coordinate has a changing coordinate transform, which follows the actual value of the coordinate during th image recording, and in that the comparator device makes a calculation analogous to a center-of-gravity calculation using the values stored in areas in the window result memory corresponding to windows placed approximately in the same direction as said coordinate.

30. An image processing device for identifying characteristics of an object or a part of an object such as shape, location or orientation using a digitalized video signal from a TV-camera directed at said object or at a location where said object is placeable, comprising:
- a computer device,
- a window memory addressable from said computer device, in which a plurality of windows having predetermined shapes are stored, each corresponding to a part of the image obtained from said TV-camera, said part being selectable by said computer device,
- a window result memory having a memory area for each window for storing an accumulated number related to said window, said window result memory being addressable from said window memory,
- an adding circuit which receives a digital gray scale pixel value based on the signal from said TV-camera into a first input and the accumulated contents of the memory area in said window result memory related to the window, which contains the picture point in question in said signal from said TV-camera, into a second input, and said adding circuit, after the adding operation, is adapted to store the added result in the same memory area in said window result memory, the contents of which were provided to said second input of said adding circuit before the adding operation, and
- a comparator device which, after every image recording of said TV-camera, compares the set of recorded values in the window result memory with a stored set or sets of values recorded for a reference object or a reference object part according to a predetermined comparison pattern and determines at least one parameter regarding the shape, location or orientation,
- wherein at least two diferent window configurations are stored in an extra memory, and in that each stored window configuration is transferable to said window memory.

31. An image processing device for identifying characteristics of an object or a part of an object such as shape, location or orientation using a digitalized video signal from a TV-camera directed at said object or at a location where said object is placeable, comprising:
- a computer device,
- a window memory addressable from said computer device, in which a plurality of windows having predetermined shapes are stored, each corresponding to a part of the image obtained from said TV-camera, said part being selectable by said computer device,
- a window result memory having a memory area for each window for storing an accumulated number related to said window, said window result memory being addressable from said window memory,
- an adding circuit which receives a digital gray scale pixel value based on the signal from said TV-camera into a first input and the accumulated ocntents of the memory area in said window result memory related to the window, which contains the picture point in question in said signal from said TV-camera, into a second input, and said adding circuit, after the adding operation, is adapted to store the added result in the same memory area in said window result memory, the contents of which were provided to said second input of said adding circuit before the adding operation, and
- a comparator device which, after every image recording of said TV-camera, compares the set of recorded values in the window result memory with a stored set or sets of values recorded for a reference object or a reference object part according to a predetermined comparison pattern and determines at least one parameter regarding the shape, location or orientation,
- wherein the window configuration is a line of windows each having a dimension of one or only a few pixels along the line but having a substantially larger width, and the TV-camera is directed at a moving mateial path such that the window configuration overlapping the recorded image is placed substantially perpendicular to the movement direction of the material path.

* * * * *